United States Patent [19]

Vondra et al.

[11] 4,134,960
[45] Jan. 16, 1979

[54] METHOD FOR DISSOLVING PLUTONIUM OXIDE WITH HI AND SEPARATING PLUTONIUM

[75] Inventors: Benedict L. Vondra; Othar K. Tallent; James C. Mailen, all of Oak Ridge, Tenn.

[73] Assignee: The United States of America as represented by the United States Department of Energy, Washington, D.C.

[21] Appl. No.: 802,398

[22] Filed: Jun. 1, 1977

[51] Int. Cl.² ............................................. C01G 56/00
[52] U.S. Cl. .................................. 423/7; 252/301.1 R; 423/20; 423/251
[58] Field of Search .......................... 423/7, 20, 251; 252/301.1 R

[56] References Cited

U.S. PATENT DOCUMENTS

| | | | |
|---|---|---|---|
| 2,813,064 | 11/1957 | Wahl | 423/251 |
| 2,926,068 | 2/1960 | Davidson et al. | 423/251 |
| 2,942,939 | 6/1960 | Beaton | 423/7 |
| 3,434,809 | 3/1969 | Swanson | 423/7 |
| 4,025,602 | 5/1977 | Campbell et al. | 423/7 |
| 4,069,293 | 1/1978 | Tallent | 423/3 |

OTHER PUBLICATIONS

Holley et al., "Proc. Second U.N. Intl. Conf. Peaceful Uses of Atomic Energy", vol. 6, p. 216, United Nations, Geneva (1958).
Cleveland I, "The Chemistry of Plutonium", pp. 142–148, 301–302, 574–575, Gordon and Breach Science Publishers, (1970), New York.
Cleveland II, "J. Inorg. Nucl. Chem.", 26, 1470–1471, (1964).

Primary Examiner—Edward A. Miller
Attorney, Agent, or Firm—Dean E. Carlson; Stephen D. Hamel; Allen H. Uzzell

[57] ABSTRACT

$PuO_2$-containing solids, particularly residues from incomplete $HNO_3$ dissolution of irradiated nuclear fuels, are dissolved in aqueous HI. The resulting solution is evaporated to dryness and the solids are dissolved in $HNO_3$ for further chemical reprocessing. Alternatively, the HI solution containing dissolved Pu values, can be contacted with a cation exchange resin causing the Pu values to load the resin. The Pu values are selectively eluted from the resin with more concentrated HI.

11 Claims, 3 Drawing Figures

METHOD FOR DISSOLVING PLUTONIUM OXIDE WITH HI AND SEPARATING PLUTONIUM

BACKGROUND OF THE INVENTION

This invention was made in the course of, or under, a contract with the United States Energy Research and Development Administration. It relates in general to the dissolution of $PuO_2$ and particularly to the dissolution of $PuO_2$-containing residues resulting from the incomplete $HNO_3$ or $HNO_3$-HF dissolution of irradiated nuclear fuels.

The difficulties associated with $PuO_2$ dissolution are widely known in the prior art. As with most materials, the difficulty of dissolution is related to the physical properties of the oxide such as density, surface area, manufacturing process, previous firing history, etc. For example, $UO_2$-$PuO_2$ fuels experiencing high sintering temperatures resulting in solid solution of the mixed oxides are soluble in 10-12 M nitric acid. Mechanically blended fuels of high $PuO_2$ content which, having been sintered at relatively lower temperatures, contain separate $PuO_2$ and $UO_2$ phases are difficultly soluble in 10-12 M nitric acid. Preferential dissolution of $UO_2$ usually occurs in these fuels, leaving difficultly soluble residues of high $PuO_2$ content. In addition, certain forms of $PuO_2$ which have been fired at very high temperatures to obtain maximum density, such as microspheres having 96-98% theoretical density and $PuO_2$ which has been sintered during irradiation in a nuclear reactor, are slow to dissolve by any known means. The subject method is particularly applicable to such difficultly soluble $PuO_2$.

PRIOR ART

Prior art dissolution techniques have been chiefly based upon the use of $HNO_3$. See, for example, W. S. Gilman, "A Review of Dissolution of Plutonium Dioxide" MLM-1264, TID-4500, UC-4, Mound Laboratory, Miamisburg, Ohio (1965) and J. H. Goode, et al. "The Dissolution of Unirradiated and Irradiated (U, Pu)$O_2$ in Nitric Acid, ORNL-5015, Oak Ridge National Laboratory (Feb. 1975). Among the method for enhancing dissolution rates are the use of oxidizing agents such as cerium IV (U.S. Pat. No. 3,005,683) and the use of a fluoride catalyst and an oxidant (U.S. Pat. No. 3,976,775).

The principal disadvantage of fluoride catalyzed dissolutions for fuel reprocessing operations are the increased corrosiveness of the dissolver solution and the interference of fluoride ion with subsequent reprocessing steps such as ion exchange. In addition, zirconium in Light Water Reactor fuels complexes fluoride and interferes with its function as a dissolution catalyst.

SUMMARY OF THE INVENTION

It is an object of this invention to provide a method of $PuO_2$ dissolution which does not introduce elements not already present in fuel reprocessing systems.

It is a further object to provide a method which does not require the use of fluoride ions.

It is a further object to provide a method which is capable of separating plutonium values from other metal values with which they may be present.

It is a further object to provide a second stage dissolution process for dissolving difficultly soluble $PuO_2$-containing residues from incomplete dissolutions of $PuO_2$ in solutions comprising $HNO_3$.

These and other objects are accomplished according to this invention in a method for dissolving solid material containing $PuO_2$, said method comprising contacting said solid material with an aqueous solution at least 3 M in HI to form an aqueous solution containing Pu values. This aqueous solution can be evaporated to dryness leaving a dry residue containing Pu values which is readily dissolvable in $HNO_3$ of above about 2 M and amenable to conventional nuclear fuel reprocessing such as Purex. Alternatively, Pu values can be separately recovered from other metal values present in the aqueous solution by cation exchange chromatography. Pu values load a cation exchange resin from 0.5 to 2.0 M HI and are selectively eluted by HI above 4.0 M.

DETAILED DESCRIPTION

Figure 1:
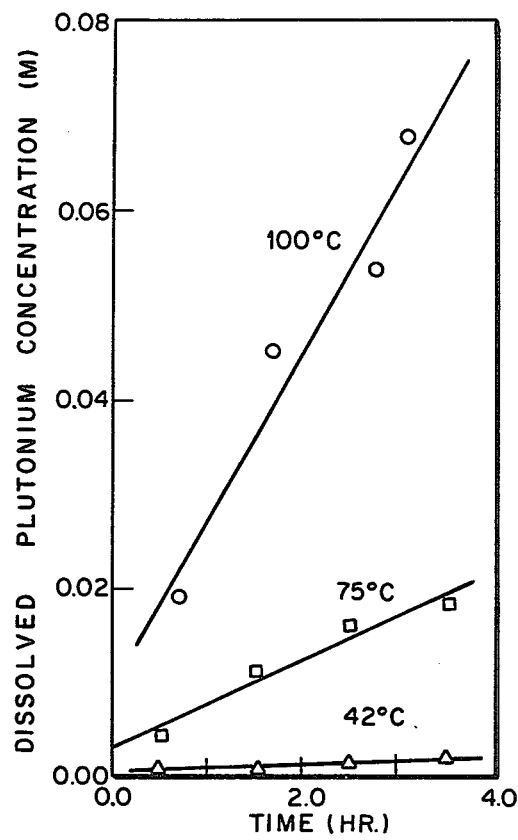
FIG. 1 is a graph of plutonium concentration vs. time for HI dissolution of several temperatures.

This invention is based upon the discovery that hydroiodic acid is at least as effective for dissolving $PuO_2$ as $HNO_3$-HF mixtures or $HNO_3$-HF mixtures containing oxidizing agents. The dissolution method of this invention is useful for any solid material comprising $PuO_2$. HI solutions are particularly useful for dissolving the $PuO_2$-containing residue remaining after incomplete dissolution of irradiated $UO_2$ or $UO_2$-$PuO_2$ nuclear fuel in $HNO_3$ or $HNO_3$-HF dissolving solutions.

The method of this invention comprises contacting solid material containing $PuO_2$ with an aqueous solution of HI. The dissolution rate is an increasing function of the HI concentration and the temperature. Below 3 M HI and 75° C. the dissolution rate is impracticably low. The preferred HI concentration is therefore the maximum tolerable by equipment and other constraints and the preferred temperature is the boiling point of the HI solution. Concentrated HI (~6.5 M) boils at about 128° C. The HI dissolver solution should contain a sufficient amount of reductant such as $H_3PO_2$ or red phosphorous to prevent evolution of $I_2$ from the oxidation of I ions. $H_3PO_2$ is typically supplied for use with HI solution as a reductant stabilizer, however, other reductants compatible with process contraints can be used as a stabilizer. The amount of reductant needed is related to the process conditions and the amount of Pu which goes into solution. Since PuIV is reduced to PuIII during the process, at least an amount stoichiometric to PuIV → PuIII reduction is needed. Generally, about 0.5 wt. % $H_3PO_2$ is sufficient to prevent $I_2$ formation, however the amount may vary due to the presence in the solution of impurities or the tendency of HI to oxidize from exposure to light. Additionally, $PuO_2$ dissolution rates in HI are substantially lower if sufficient reductant to prevent $I_2$ formation is not present. Of course, it is a matter of routine testing to determine the minimum amount of reductant needed to prevent $I_2$ evolution and provide high dissolution rates in a particular system. The following examples demonstrate the dissolution of $PuO_2$ in HI. The $PuO_2$ used for Examples 1 and 2 was refractory PuO$_2$ microspheres having a surface area of 0.012 m$^2$/g, and a bulk density of 11.0 g/cc (96% theoretical), which simulates the most difficultly soluble PuO$_2$ residues from spent reactor fuel.

EXAMPLE 1

A series of dissolution tests were conducted to determine the dissolution rate of PuO$_2$ microspheres by digesting 0.4 to 0.8 g. of PuO$_2$ in 6 ml. volumes of stirred aqueous HI solution in glass equipment at 42, 75 and 100° C. The tests were made using 2.48, 3.69, 6.73, and 7.53 M HI solutions which were stabilized with 1.2 wt.% H$_3$PO$_2$. The microspheres had been calcined at 1150° C. in an argon-4 wt.% hydrogen mixture to produce dense PuO$_2$ containing little or no excess oxygen. During the dissolution tests, liquid samples were withdrawn at temperature and analyzed for plutonium by gross alpha and alpha pulse-height techniques. A conventional spectrophotometer was used for valence analysis of plutonium in the dissolver solutions. The fraction of PuO$_2$ dissolved was less than 0.25 in each test used to obtain the data presented in Tables I and II. Table I depicts the amount of plutonium dissolved versus time for 0.5 g of PuO$_2$ microspheres digested in 6 ml of aqueous HI solution at the several acid concentrations and temperatures.

Figure 2:
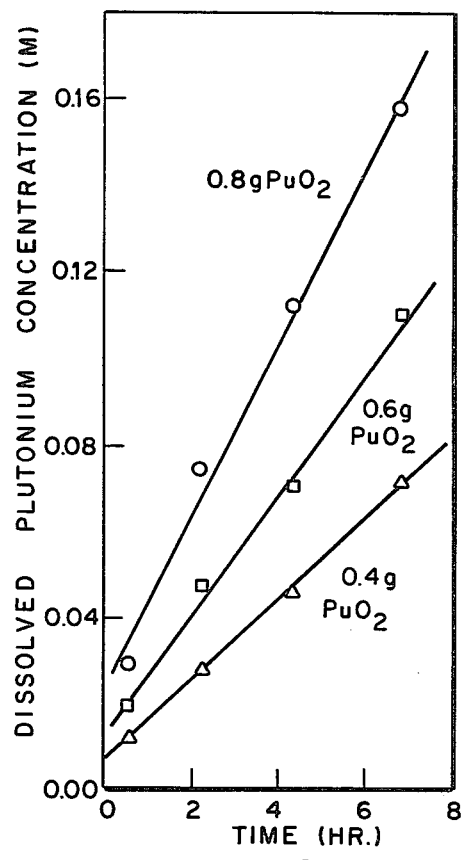
FIG. 2 is a graph of plutonium concentration vs. time for HI dissolution of several amounts of $PuO_2$ in the dissolver.

FIG. 1 depicts the data from Table I for 7.35 M HI. It is apparent that higher temperatures result in increased dissolution rates (slope of the concentration line). FIG. 2 depicts the dissolution of various amount of PuO$_2$ from Table I in 6 ml of 6.73 M HI at 100° C. The dissolution rate is shown to increase with additional amounts of PuO$_2$ present. Table II shows the dissolution rates of PuO$_2$ at the several acid concentrations at various temperatures for 0.5 g of PuO$_2$ microspheres digested in 6 ml of dissolvent. The dissolution rate is shown to be an increasing function of both temperature and HI concentration. The rates were determined from statistical analysis of the data sets of Table I. The net surface area of undissolved PuO$_2$ was assumed to have remained approximately constant or to have increased only slightly due to surface roughening. Table III shows the dissolution rate and normalized dissolution rate of PuO$_2$ microspheres in 6 ml of 6.73 M HI with a mean HI activity of 9.6 at 100° C. The normalized dissolution rate is defined as the millimoles of plutonium dissolved per hour per square meter of PuO$_2$ surface area in the sample.

TABLE I

Concentration of Plutonium Dissolved as a Function of Dissolution Time and Temperature

| Time (h) | Concentration of HI (M) | Temperature (° C) | Dissolved Plutonium (M) |
|---|---|---|---|
| 0.67 | 2.48 | 100 | 0.0006 |
| 1.67 | 2.48 | 100 | 0.0013 |
| 2.75 | 2.48 | 100 | 0.0021 |
| 3.08 | 2.48 | 100 | 0.0032 |
| 0.67 | 3.68 | 100 | 0.0018 |
| 1.67 | 3.68 | 100 | 0.0041 |
| 2.75 | 3.68 | 100 | 0.0068 |
| 3.08 | 3.68 | 100 | 0.0082 |
| 0.67 | 7.35 | 100 | 0.0188 |
| 1.67 | 7.35 | 100 | 0.0448 |
| 2.75 | 7.35 | 100 | 0.0536 |
| 3.08 | 7.35 | 100 | 0.0678 |
| 0.50 | 2.48 | 75 | 0.00007 |
| 1.50 | 2.48 | 75 | 0.0002 |
| 2.50 | 2.48 | 75 | 0.0004 |
| 0.50 | 3.68 | 75 | 0.0003 |
| 1.50 | 3.68 | 75 | 0.0008 |
| 2.50 | 3.68 | 75 | 0.0014 |
| 0.50 | 7.35 | 75 | 0.0044 |
| 1.50 | 7.35 | 75 | 0.0109 |
| 2.50 | 7.35 | 75 | 0.0160 |
| 3.50 | 7.35 | 75 | 0.0183 |
| 0.50 | 2.48 | 42 | 0.00009 |
| 1.50 | 2.48 | 42 | 0.00016 |
| 2.50 | 2.48 | 42 | 0.00019 |
| 3.50 | 2.48 | 42 | 0.00022 |
| 0.50 | 3.68 | 42 | 0.0009 |
| 2.50 | 3.68 | 42 | 0.0011 |
| 3.50 | 3.68 | 42 | 0.0012 |
| 0.50 | 7.35 | 42 | 0.0002 |
| 1.50 | 7.35 | 42 | 0.0004 |
| 2.50 | 7.35 | 42 | 0.0012 |
| 3.50 | 7.35 | 42 | 0.0016 |

TABLE II

Dissolution Rates of PuO$_2$ in Aqueous Solutions

| Concentration of HI (M) | Dissolution Temperature (° C) | Plutonium Dissolution Rate (millimoles h$^{-1}$ g$^{-1}$) |
|---|---|---|
| 7.35 | 100 | 0.2196 |
| 3.68 | 100 | 0.0312 |
| 2.48 | 100 | 0.0120 |
| 7.35 | 75 | 0.0564 |
| 3.68 | 75 | 0.0072 |
| 2.48 | 75 | 0.0024 |
| 7.35 | 42 | 0.0060 |
| 3.68 | 42 | 0.0012 |
| 2.48 | 42 | 0.00048 |

TABLE III

Effect of PuO$_2$ Sample Size on Dissolution Rate

| Weight PuO$_2$ (g) | Dissolution Rate (millimoles/h) | Normalized Dissolution Rate (millimoles h$^{-1}$ m$^{-2}$) |
|---|---|---|
| 0.40 | 0.0556 | 11.75 |
| 0.50 | — | 12.75 |
| 0.60 | 0.0846 | 11.75 |
| 0.80 | 0.1212 | 12.65 |

The data obtained from the dissolution tests of this example, when combined with mean HI activity coefficients, corresponding HI concentrations and degrees of dissociation used to calculate the activities, permitted the determination of the order of the dissolution reaction with respect to the HI activity. The dissolution reaction at the three temperatures of 42, 75 and 100° C. was shown to be second order with respect to the HI activity. The rate constants for these three temperatures were 5.7 × 10$^{-5}$, 3.6 × 10$^{-4}$, and 1.55 × 10$^{-3}$, respectively. Based on the essentially constant normalized dissolution rates of Table III, it appears that the dissolution rate is first order with respect to PuO$_2$ surface area.

The following example illustrates HI dissolution followed by evaporation to dryness and dissolution of the dry residue in HNO$_3$.

EXAMPLE 2

A one gram quantity of PuO$_2$ microspheres was dissolved in 25 ml of 6.35 M HI at about 128° C. in less than 8.0 hours. The HI solution was stabilized with 1.2 wt.% H$_3$PO$_2$. The resulting dissolver solution had a dark blue color indicating the presence of Pu(III). The dissolver solution was distilled to dryness. The dried cake was divided into three approximately equal parts. One part of the dried solids was dissolved in 10 ml. of 8.0 M HNO$_3$ in 0.25 hours to yield a 0.123 M Pu(IV) solution with less than 1 mg/ml iodide concentration.

Example 3 demonstrates the use of HI dissolution of residues remaining from incomplete $HNO_3$ dissolution of irradiated nuclear fuel. This example also demonstrates that HI dissolves $PuO_2$ from such residues at a faster rate than $UO_2$. This is highly unexpected since in all other dissolvents $UO_2$ dissolves preferentially to $PuO_2$.

EXAMPLE 3

A Liquid Metal Fast Breeder Reactor fuel rod containing vibratorily compacted $UO_2$-$PuO_2$ powder was irradiated in a test facility to simulate 10.7% burnup in an operating reactor. The fuel rod was sheared and the powdered contents were digested in 8 M $HNO_3$ at about 100° C. for 4 hours, whereupon a difficultly soluble residue remained. Approximately 90 mg of of this residue was refluxed in 12 ml of 6.0 M HI at 125° C. for 3¼ hours, at which time 4.28 mg of Pu and 3.85 mg of uranium were dissolved. The residue was then refluxed for another 3½ hours after which the amount of dissolved plutonium was approximately unchanged and the amount of dissolved uranium had increased to 4.53 mg. The remaining residue was chiefly unidentified corrosion and fission products. The dissolver solution was then evaporated to dryness. The distillate contained $1.09 \times 10^3$ alpha counts/min/ml, indicating less than $1 \times 10^{-5}$ mg/ml of plutonium present, demonstrating that plutonium can be effectively separated from the HI solution. The dried solids were refluxed in 50 ml of 8.0 M $HNO_3$ for 2.0 hours at $-105°$ C. after which the solution was cooled and centrifuged. There were 4.36 mg of plutonium and 6.20 mg of uranium in the supernate. The dried solids from the centrifuge weighed less than 2.0 mg. When analyzed after $Na_2CO_3$ fusion this residue contained less than 0.027 mg of plutonium or less than 0.6% of the original plutonium in the 90 mg of original residue. No uranium was found in this residue. Prior experience has indicated that the dissolution rate of residues remaining after several hours of $HNO_3$ dissolution is impractically slow even in more concentrated $HNO_3$. The dissolution rate of such residues in HI is about the same as in 12 M $HNO_3$ - 0.04 M HF, however, it is doubtful that such residues will completely dissolve in the $HNO_3$-HF solution, since some corrosion and fission products form fluoride compounds with low solubilities.

The dry solids remaining after evaporation of the HI solutions are readily soluble in $HNO_3$. It is not necessary that the HI completely dissolve $UO_2$ present since it is readily dissolvable in the $HNO_3$. Accordingly, the preferred method is that residue from initial fuel dissolution in $HNO_3$ or $HNO_3$-HF be recovered and contacted with HI solution for sufficient time to dissolve at least 90 wt.% of $PuO_2$ present, and then evaporated to dryness leaving a dry residue containing some undissolved $UO_2$. The dry residue is dissolved in $HNO_3$ and the resulting solution can be combined with the solution from the original fuel dissolution for treatment by conventional fuel reporcessing operations such as are more fully described in *Engineering for Nuclear Fuel Reprocessing*, Justin T. Long, Gordon and Breach, New York (1967). The Pu values in the residue remaining from evaporation of the HI solution are believed to be principally in the form of PuOI, as described for the chemical reaction of $PuO_2$ with gaseous HI in Seaborg, et al (eds) *The Transuranium Elements*, National Nuclear Energy Series, IV, 14B, Part 2, pp 957-963, McGraw-Hill Book Co., Inc., New York (1949). The $HNO_3$ concentration for the PuOI residue dissolution is not critical and can generally be any concentration above about 2 M, with above about 4 M preferred to effect a more rapid PuOI dissolution and to provide for more complete oxidation of $I^-$ to $I^2$ which is subsequently eliminated from the solution as a gas.

As an alternative to recovering the plutonium values from the HI solution by evaporation and $HNO_3$ dissolution, it has been found according to this invention that Pu can be separated from HI solutions by cation exchange chromatography. This method is particularly useful if Pu is to be separated from other metal values such as uranium and fission products present in irradiated fuels. According to this embodiment the HI solution containing dissolved Pu values and other metal values is adjusted to 0.5 to 2.0 M HI to provide an ion exchange feed solution. The ion exchange feed solution is contacted with a weak acid or strong acid cation exchange resin. It has been found that at these HI concentrations, Pu values load preferentially to many of the corrosion and fission products normally present in spent reactor fuel dissolver solutions. Other metal ions such as trivalent lanthanides and quadrivalent thorium load about the same as, or preferentially to, the plutonium in 0.5-2 M HI. The Pu loaded resin is then contacted with at least about 4 M and preferably 4 to 6 M HI whereupon Pu values are selectively eluted from the resin leaving lanthanides and thorium still bound. The eluate solution is substantially (i.e. an order of magnitude) less concentrated in metal values other than Pu. The capability for separating Pu values from other metal values in HI solutions is shown by the following experimental example demonstrating the distribution coefficients for various metal values between polystyrene-divinylbenzene sulfonic acid resin and HI solutions of various concentrations.

It is well known that distribution coefficients for ions between solvents and ion exchange resins are directly related to the degree of separation achieveable for the ions by ion exchange chromatography. More specifically, the volume of eluting agent needed to elute the maximum of an elution peak is approximately equal to the distribution coefficient (resin/eluent) multiplied by the mass of dry resin in a column. Accordingly, the greater the difference in the ratio of the distribution coefficients of two cations the greater the ratio of the maximum peak elution volumes. This ratio is called the separation factor and indicates the degree of separation available for two ionic species in a resin/eluent system. The relationship of the equilibrium distribution coefficients to elution behavior is more fully described in an article by F. W. E. Strelow, *An Ion Exchange Selectivity Scale of Cations Based on Equilibrium Distribution Coefficients*, Analytical Chemistry, Vol. 32, No. 9, Aug. 1960, pp 1185-1188, which is incorporated herein by reference.

EXAMPLE 4

Tests were conducted by equilibrating 1.0-2.0 g of cation exchange resin with 10 ml of 0.50 to 5.50 M HI solution containing varying concentrations of metal iodides in glass equipment at 25° C. for 48 hours. The resin used was Dowex (Reg. Trademark) 50W-X4, 50-100 mesh with a capacity of 5.12 meq/dry g. This resin is more fully described in *Ion Exchange*, Frederich Helfferich, McGraw-Hill, New York, p. 35, (1962). After the equilibrations the solutions were filtered through a coarse glass frit. The resin left on the frit was washed with water and dried and the acid and metal ion concentration on the dry resin and the filtrate was determined. Distribution coefficients (defined as the concentration of metal ion per gram of dry resin divided by the concentration of metal ion per ml of solution at equilibrium) were calculated from the data. The distribution coefficients were calculated for a variety of metal ions representative of ionic species present in irradiated reactor fuel dissolver solution. In general, the distribution coefficients were found to decrease with increase in HI concentration, although certain metal ions ($Ca^{2+}$, $UO_2^{2+}$, $Gd^{3+}$, $La^{3+}$, and $Ce^{3+}$) showed a decrease in distribution coefficient to a minimum between 1.5 and 3.0 M HI and thereafter increased as HI concentration increased. In general, trivalent ions ($Cr^{3+}$, $Ce^{3+}$, $Gd^{3+}$, $La^{3+}$ and $Pu^{3+}$) had much larger distribution coefficients than divalent ions ($Cd^{2+}$, $Fe^{2+}$, $Zn^{2+}$ and $UO_2^{2+}$) with the exceptions being $Al^{3+}$ which had relatively low and $Ca^{2+}$ which had relatively high distribution coefficients. The largest distribution coefficients obtained were for $Th^{4+}$.

Figure 3:
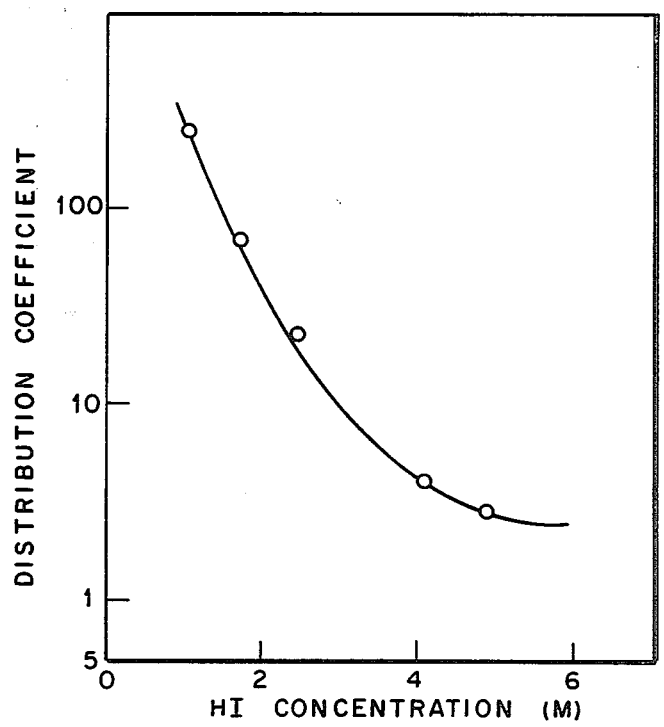
FIG. 3 is a graph of the log of the distribution coefficient between HI and cation exchange resin vs. HI concentration.

The $UO_2^{2+}$ absorbability goes through a minimum at 2.5 M HI where the distribution coefficient is 92 for 0.37 M HI and 16.2 in 3.72 M HI. The stable oxidation state of plutonium in HI solution is $Pu^{3+}$. The distribution coefficients for $Pu^{3+}$ decrease from 270 to 2.9 as the HI concentration increases from 1.0 to 4.9 as shown in FIG. 3. The test results indicated that the absorbability of $Pu^{3+}$ is substantially higher in 1.0 M HI than of any of the other metal ions tested except $La^{3+}$ and $Th^{4+}$. The absorbability of $Pu^{3+}$ in 4.0 M HI is substantially less than that of $Th^{4+}$ and $La^{3+}$. Accordingly, where a solution of 0.5 to 2.0 M HI containing $Pu^{3+}$ (as provided by $PuO_2$ dissolution in HI and dilution to proper HI molarity) is contacted with a cation exchange resin, the $Pu^{3+}$ preferentially loads the resin along with trivalent lanthanides and quadrivalents. Upon elution with 4 to 6 M HI, the $Pu^{3+}$ preferentially elutes from the resin, resulting in a HI solution containing Pu values and substantially less concentrated in other metal values. Of course, the exact reduction in concentration of other metal values will depend upon their distribution coefficients relative to that of $Pu^{3+}$. Table IV presents the distribution coefficients of the ions tested in 1 M HI and 4 M HI at 25° C. The metal values tested are to be considered representative of the various classes of ions present in irradiated nuclear fuel solutions. For example, the behavior of lanthanides is represented by $La^{3+}$, $Ce^{3+}$ and $Gd^{3+}$ and the behavior of quadrivalents is represented by $Th^{3+}$. Of course, the observed variations of distribution coefficients for the metal ions suggest that several other cation separations are possible by HI chromatography.

TABLE IV

Distribution of Metal Ions Between Dowex 50-X4, 50–100 Mesh Resin and Aqueous HI Solutions at 25° C

| Metal Ion | Distribution Coefficients | |
|---|---|---|
| | 1.0 M HI | 4 M HI |
| $Pu^{3+}$ | 270.0 | 4.5 |
| $Cd^{2+}$ | 0.5 | — |
| $Fe^{2+}$ | 6.5 | 2.0 |
| $Zn^{2+}$ | 8.0 | 1.0 |
| $Al^{3+}$ | 10.0 | 4.0 |
| $Co^{2+}$ | 10.0 | 2.0 |
| $UO_2^{2+}$ | 11.0 | 25.0 |
| $Ca^{2+}$ | 45.0 | 20.0 |
| $Cr^{3+}$ | 60.0 | 8.0 |
| $Ce^{3+}$ | 150.0 | 30.0 |
| $Gd^{3+}$ | 150.0 | 30.0 |
| $La^{3+}$ | 250.0 | 550.0 |
| $Th^{4+}$ | 5000.0 | 200.0 |

What is claimed is:

1. A method for dissolving solid material comprising $PuO_2$ and $UO_2$ said method comprising the steps of
    (a) contacting said solid material comprising $PuO_2$ and $UO_2$ with an aqueous solution comprising $HNO_3$ to dissolve a portion of said $PuO_2$ and $UO_2$ thereby providing a first aqueous solution containing Pu and U values and a first solid residue containing $PuO_2$ and $UO_2$;
    (b) contacting said first solid residue with an aqueous solution comprising at least 3 M HI for a time insufficient to completely dissolve $UO_2$ present in said first solid residue to form a second aqueous solution containing Pu and U values;
    (c) evaporating said second aqueous solution containing Pu and U values to dryness leaving a second solid residue containing $UO_2$ and Pu and U values; and
    (d) contacting said second solid residue with an aqueous solution greater than about 2 M in $HNO_3$ to provide a third aqueous solution containing Pu and U values.

2. The method of claim 1 in which said solid residue is contacted with said aqueous solution comprising HI for sufficient time to dissolve at least 90 wt.% of $PuO_2$ present in said solid residue.

3. The method of claim 2 in which said solid material comprising $PuO_2$ and $UO_2$ comprises irradiated nuclear fuel.

4. The method of claim 3 in which said aqueous solution in step (a) is 8 M in $HNO_3$.

5. A method for separating Pu values from U and other metal values comprising the steps of
    (a) first providing an aqueous ion exchange feed solution 0.5–2 M in HI and containing Pu values, U values and other metal values;
    (b) contacting said ion exchange feed solution with a sulfonic acid cation exchange resin to cause Pu values and a portion of said other metal values to load onto said resin;
    (c) contacting said loaded resin with an aqueous solution at least 4 M in HI to preferentially elute Pu values from said loaded resin to provide an eluate solution substantially less concentrated in uranium and other metal values than said ion exchange feed solution.

6. The method of claim 5 wherein said other metal values in said ion exchange feed solution comprise Cd, Fe, Zn, Al, Ca, Cr, Ce, Gd, Th and lanthanides.

7. The method of claim 5 wherein said ion exchange feed solution is provided by contacting solid material comprising $PuO_2$, $UO_2$ and other metal values with an aqueous solution comprising at least 3 M HI to form an aqueous solution containing Pu, U and other metal values.

8. The method of claim 5 wherein said ion exchange feed solution is provided by
    (a) contacting solid irradiated nuclear fuel containing $PuO_2$, $UO_2$ and other metal values with an aqueous solution comprising HNO₃ to dissolve a portion of the PuO₂ in said irradiated nuclear fuel and leave a solid residue containing PuO₂, UO₂ and other metal values;

(b) contacting said solid residue with an aqueous solution comprising at least 3 M HI to form an HI solution containing Pu, U and other metal values; and (c) adjusting said HI solution to 0.5–2 M HI to provide said ion exchange feed solution.

9. The method of claim 8 wherein said aqueous solution comprising HNO₃ is 8 M in HNO₃.

10. The method of claim 6 wherein said cation exchange resin is a polystyrene-divinyl benzene sulfonic acid resin.

11. The method of claim 10 wherein said Pu and U values in said ion exchange feed solution are Pu(III) and U(VI).

* * * * *